United States Patent Office 3,143,054
Patented Aug. 4, 1964

3,143,054
DEVICE FOR ADJUSTING LIGHT MEASURING INSTRUMENTS, PARTICULARLY FOR PHOTOGRAPHIC CAMERAS WITH AUTOMATIC DIAPHRAGM ADJUSTMENT
Martin Ploke, Kiel, and Heinz Thiele, Kiel-Wik, Germany, assignors to Zeiss Ikon Aktiengesellschaft, Stuttgart, Germany
Filed June 19, 1961, Ser. No. 118,179
Claims priority, application Germany June 18, 1960
3 Claims. (Cl. 95—64)

The invention relates to a device for adjusting light measuring instruments, particularly used in photographic cameras equipped with an automatic diaphragm adjustment. The device is provided with a bridge circuit which is operated by direct current or alternating current and which includes a photo-electric resistance ahead of which is arranged an automatically adjustable light weakening device or adjustable iris diaphragm which is drivingly connected to a similar diaphragm in front of the objective such as is shown and described in United States Patents 1,974,433 and 2,194,031, issued to Riszdorfer, Sept. 25, 1934, and March 19, 1940. Other United States patents showing drive means such as gears and the like connecting the iris diaphragm in front of a photo-electric cell to the iris diaphragm in front of a camera objective are 2,576,813 and 2,935,921.

The prior art devices of this type are disadvantageous in that the sensitiveness of the bridge circuit when exposure factors are electrically introduced, can be maintained approximately constant when all of the bridge resistances are adjusted in accordance with the introduced value. This amounts to an increase in the number of elements required as well as in the possibility of operating difficulties and can be avoided by the present invention. The device can be adjusted easily and quickly without reference to various charts and tables.

One of the important objects of the invention to overcome the above and other disadvantages of the prior art devices by providing a single bridge resistance for the introduction of exposure factors into the measuring arrangement. If one would employ a resistance in a branch of the bridge which does not contain the photo-electric resistance, then the sensitiveness of the circuit would be subjected to substantial variations in dependence of the introduced values. In addition, the sensitiveness of the bridge circuit would depend to a great extent upon the manufacturing tolerances of the photo-electric resistances since the sensitivity of the circuit for the stability of the adjusting operation and for an avoidance of oscillation is controlling. It is the sensitivity of the circuit arrangement upon which the adjusting operation depends and whether the latter will be stable and will be without oscillations. If, however, a photo-electric resistance has been introduced with rather large tolerances, then there exists the danger that an adjusting operation which in itself would be stable would no longer have this property owing to the extension of the maximum sensitivity into a range within which the stabilization can no longer be secured. In addition, the manufacturing tolerances may cause such a change in the photo-electric resistance that the sensitivity of the circuit arrangement is unfavorably affected.

The drawings illustrate diagrammatically and by way of example a few embodiments of the invention.

Figure 1:
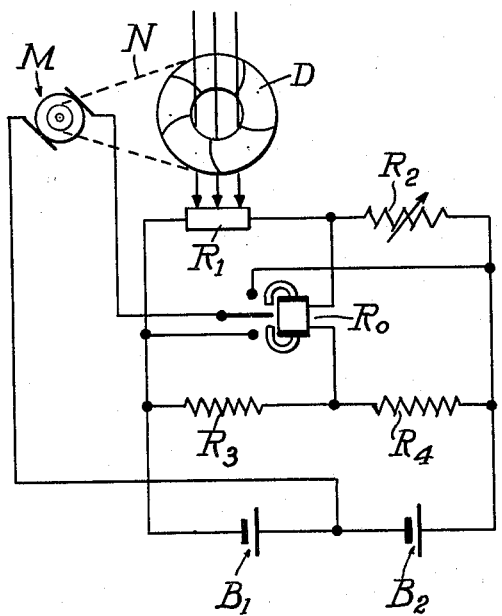
FIG. 1 illustrates an automatic diaphragm adjusting mechanism controlled by the novel bridge arrangement of the present invention.

Referring in general to the FIGURES 1, 4, 5, 7, 8 and 9, all of which show a bridge circuit in one branch of which is arranged a photo-electric resistance $R_1$ which is illuminated by light passing through an automatically adjustable diaphragm D shown only in FIG. 1. The adjustment of the diaphragm is accomplished by an electric motor M driving an endless cable, gearing or any suitable transmission schematically indicated at N. The operation of the motor M is controlled by a relay $R_0$ arranged in the diagonal of the bridge circuit.

In accordance with the present invention there is employed a bridge resistance $R_2$ which is arranged in series with the photo-electric resistance $R_1$ when exposure factors, particularly the sensitivity of the film, are introduced into the circuit arrangement. For this purpose the resistance $R_2$ is made continuously variable or is made variable in individual steps and the individual adjusted positions or steps correspond to different resistance values which are matched properly with the resistance values of the photo-electric resistance and the values to be introduced. In this connection the following explanation is made: The adjusting mechanism of the present invention permits the diaphragm aperture to be adjusted in dependence of the brightness of the object to be photographed in such a manner that upon completion of the adjusting process the same light intensity will always be admitted to impinge on the photo-electric resistance. The amplitude of this illumination or light intensity depends, however, upon the introduced values according to theoretical principles, paricularly from the sensitivity of the film or other exposure factors to be considered by an adjustment of the resistance $R_2$. These different values of the illumination intensity correspond to different resistance values of the photo-electric resistance $R_1$ of the photo-meter. In accordance with the invention, the resistance $R_2$ is so determined that the relationship $$u = \frac{R_1}{R_2}$$

is constant for all introduced values after the adjusting mechanism has been set into operation. This means that also the resistances $R_3$ and $R_4$ have to be dimensioned for the same resistance ratio because when the bridge circuit is balanced, the ratio equation is $R_1:R_2=R_3:R_4$. Furthermore, in accordance with the invention the resistance ratio is adjusted to such a value that the relay in the bridge circuit for operating the diaphragm mechanism during the smallest electrically considered film sensitivity, namely at the greatest exposure factor, reaches its greatest response sensitivity. Also during deviation of the photo-electric resistance values up to the factor 3 respectively ⅓ of the desired value, for instance caused by the manufacturing process, will not be exceeded for high sensitive nor for low sensitive photo-electric resistances or photo-conductive cells.

An automatic diaphragm mechanism of the mentioned type has to have on one hand a great accuracy in its adjustability and on the other hand a good stability of the control operation. In order to meet these requirements, the control circuit has to have a high sensitivity, but it must not become unstable as a result of unfavorable operating conditions, for instance on account of the tolerances which occur when the electrical circuit elements are manufactured. This applies particularly to the manufacture of photo-electric resistances which, when they are unstable, will cause oscillations. The inclination to instability is then the greatest when the film sensitivities are low and also, when there is abundant light and when a photo-electric resistance is used having a high sensitivity.

When the bridge circuit is constructed in such a manner that preferably the resistance $R_2$ (FIG. 1) is arranged in series with the photo-electric resistance $R_1$ and is used for introducing the film sensitivity in to the circuit, then the circuit arrangement has the property that it furnishes the greatest control current when the film sensitivity is the lowest. As a meausre for the control current is suitable an interval current having the size $\Delta i$. This is a control current which passes through the control relay when the illumination intensity of the photo-electric resistance changes about one interval, namely about the factor 2 or .5 after the bridge circuit has been balanced.

Figure 2:
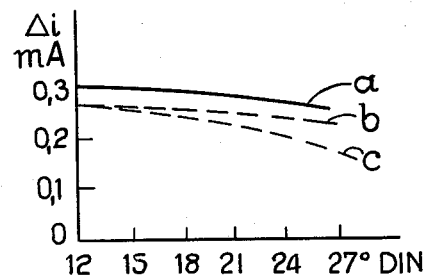
FIG. 2 is a graph of the operation of the bridge arrangement.

FIG. 2 illustrates the manner in which this interval current in the above proposed bridge circuit changes in dependence of the introduced film sensitivity by its DIN number (DIN denotes "German Industry Standard"). The characteristic $a$ which is formed by a photo-electric resistance of average sensitivity shows that the interval current from 12° to 27° DIN drops continuously, for instance from .3 milliampere to .25 milliampere. When the photo-electric resistance has a greater sensitivity as shown by the characteristic $b$ or has a smaller sensitivity as shown by the characteristic $c$, the drop is smaller or larger.

FIG. 2 explains, however, that the bridge circuit may be so dimensioned that the interval current when the introduced value is small and, in particular, when using highly sensitive or less sensitive photo-electric resistances, will not exceed the value given by example, namely .3 ma. the illustrated example this current of .3 ma. indicates the desired operating current of an automatic diaphragm mechanism which on one hand will have a high adjusting accuracy and on the other hand will prevent an instability of the adjusting operation.

An additional advantage of the proposed bridge circuit consists in this that photo-electric resistances may be used with any desired curved characteristic, particularly those which have in double logarithmic presentation a curved resistance (R)-illumination intensity (E) form, since owing to the proportional formation of the value range of the resistances $R_1$ to $R_2$ it is possible to electrically compensate for any abnormal characteristics of the photo-electric resistance.

It is also desired to emphasize the practical advantage which consists therein that the bridge arrangement at the lowest film snesitivity has its greatest response sensitivity. Since high sensitivity films can be produced with a greater time exposure tolerance than low sensitivity films, the form of the sensitivity characteristic as shown in FIG. 2 will meet all practical requirements.

In accordance with the invention the amplitude of the interval current is influenced, as will be described hereinafter, by the two fixed resistances $R_3$ and $R_4$ of the second branch of the bridge. Depending upon the adaptability, namely upon the size of the relay resistance $R_0$ when compared with the other bridge resistances, one requires for a predetermined control current different fixed resistances of different values $R_3$ and $R_4$ and the rule is that the bridge will be more sensitive the lower are the resistances $R_3$ and $R_4$. Therefore, with the assistance of the resistances $R_3$ and $R_4$ the sensitivity may be adjusted to a permissible optimum value. It is intended that this optimum value will not be exceeded when employing photo-resistances of different sensitivities. On the other hand, this intended value should not fall short much of the optimum value. An investigation has shown that this property can be substantially influenced by a suitable selection of the resistance property $$u = \frac{R_1}{R_2}$$

for balancing the bridge circuit.

In accordance with the invention one of the two resistances $R_3$ and $R_4$, preferably the resistance $R_3$, is of a constant value while the other resistance, preferably the resistance $R_4$, for the purpose of balancing the bridge and for compensating the leakage radiation of the photo resistances may be made adjustable or exchangeable. When the constant value of the resistance $R_3$ has been determined, then the proper selection of the resistance $R_4$ can be made which may advantageously have less sensitive photo-electric resistance and has a greater resistance $R_1$ at a predetermined illumination than an average photo-electric resistance which is smaller than the value of the resistance $R_4$ which corresponds to the smallest value of the resistances $R_3 + R_4$ which last two determine the sensitivity. The loss in sensitivity by employing a less sensitive photo-electric resistance in this case will be balanced in part by an increase of the sensitivity of the bridge circuit.

If later the necessity arises that corrections have to be introduced into the bridge circuit, then it may be advisable to make the originally installed fixed resistance $R_3$ exchangeable or adjustable within certain limits. For this subsequent change it is advisable that all resistances $R_3$ manufactured in one series have the same value or may be adjusted to the same constant value.

Figure 3:
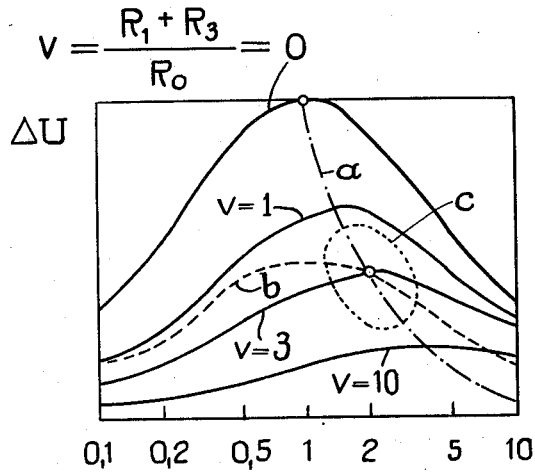
FIG. 3 is another graph showing another function of the bridge arrangement.

For explaining the allegation that the proposed circuit arrangement can be made immune against dispersion or deviation of the photo-electric resistances by a suitable selection of the resistance ration $u$ for the balancing of the bridge circuit, attention is directed to FIG. 3. This FIG. 3 illustrates a graph of the so-called interval voltage $\Delta U$ as a function of the resistance ratio $$u = \frac{R_1}{R_2} = \frac{R_3}{R_4}$$

By interval voltage is understood the terminal voltage which is applied to the current consumer, namely the relay having the resistance $R_0$ in the diagonal branch of the bridge circuit when the illumination intensity of the photo resistance after the balancing of the bridge changes step by step about the factor 2 and .5 respectively, namely about one exposure interval. Upon response of the adjusting mechanism this voltage will again become zero, therefore it is only in the first instant effective, before the automatic adjusting mechanism responds, and constitutes a measure of the sensitivity of the bridge arrangement.

As parameter is selected the value $$v = \frac{(R_1 + R_3)}{R_0}$$

The characteristic $v=0$ constitutes the no-load voltage, while the characteristics $v=1, 3, 10$ represent incresaing loads of the bridge during the decreasing consumer resistance $R_0$. The characteristics have each a maximum value which beginning with $u=1$ are displaced with increasing load more and more toward higher $u$ values. In accordance with the invention the resistance ratio $u$ is so selected that the working point of the circuit arrangement at the smallest film sensitivity introduced by the resistance $R_2$, namely at the smallest value $R_1$ min of the average photo resistance will be approximately at the maximum of the respective $v$-characteristic. In this connection it is to be noted that usually $R_{1\ min}$ is small compared with $R_3$ so that the effective voltage even when the photo-electric resistance has a different resistance value, that is when the photo-electric resistances have different sensitivity, that then the selected $v$-characteristic, for instance $v=1$, applies. The selected adjustment has the result that photo-electric resistances with double or one half sensitivity, respectively, produce an effective voltage which is only approximately 11% lower than that furnished by an average photo-electric resistance. This condition can also be defined in such a manner that one adjusts the resistance ratio $u$ for the average photo resistance to a value $u>1$, or more accurately, $u=\sqrt{1+(R_{1\ min}+R_3)/R_0}$. Owing to the equation $u=\sqrt{1+v}$ the local characteristic $a$ of the maximum value is indicated in FIG. 3.

It is further intended that the bridge during the greatest film sensitivity to be introduced and at which the resistance of the average photo-electric resistance reaches its greatest value $R_{1\ max}$ is adapted as far as power capacity is concerned to the relay resistance. This adaptation is reached at one half of the no-load voltage (characteristic $b$ in FIG. 3). It complies with the condition $v=1+u$ so that approximately $$\frac{(R_{1\ max}+R_3)}{R_0}=1+u$$

is to be selected. The two characteristics $a$ and $b$ in FIG. 3 intersect at the point where $u=2$ and $v=3$ which corresponds to the optimum power adaptation of the consumer $R_0$ at the given values of $R_1$, $R_3$. The bridge is suitably adjusted to this working point when only relatively few exposure values are to be introduced into the bridge, or, in a special case, when only one exposure value is to be introduced electrically. These working conditions are present particularly then when film sensitivity values and other exposure values are introduced in part also by optical means, for instance by a light weakening device arranged in front of the photo-electric resistance. FIG. 3 also discloses a local curve by a closed dotted line which corresponds to an energy adaptation of 90%. In order to obtain at least 90% energy adaptation, the values $u$ and $v$, as shown in FIG. 3, have to be within the tolerances 1, $2<u<3$, 2 and 1, $5<v<7$.

Figure 4:
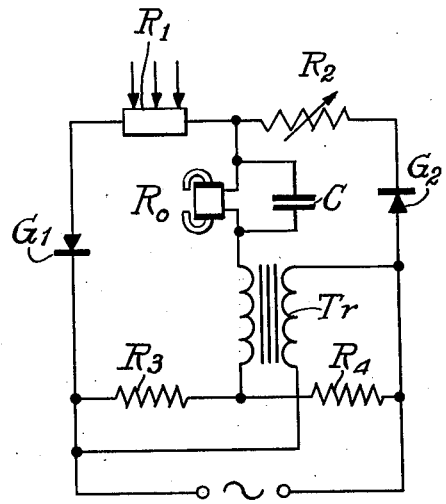
FIG. 4 illustrates a modified bridge arrangement for an automatic diaphragm adjusting mechanism operated by alternating current.

FIG. 1 and the description made with reference to the same relates to a bridge circuit operated by direct current. The same conditions, however, are also applicable when the bridge circuit is operated by alternating current. FIG. 4 shows an embodiment of the invention which shows in addition to the previously mentioned four bridge resistances $R_1$, $R_2$, $R_3$ and $R_4$ also two rectifiers $G_1$ and $G_2$, a smoothing condenser $C$ and a transformer $Tr$ for the introduction of a constant auxiliary alternating voltage into the diagonal branch of the circuit. The purpose of the auxiliary voltage is to control the rectifiers in the linear portion of the rectifying characteristic. As a result of this arrangement the generally curved characteristic of the rectifiers does not reduce the sensitivity of the circuit arrangement. The relay is constructed as a polarizing control relay in the same manner as when direct current is being used. For increasing the sensitivity a so-called zero current amplifier may be interposed between the diagonal branch of the bridge and the rectifiers.

Figure 5:
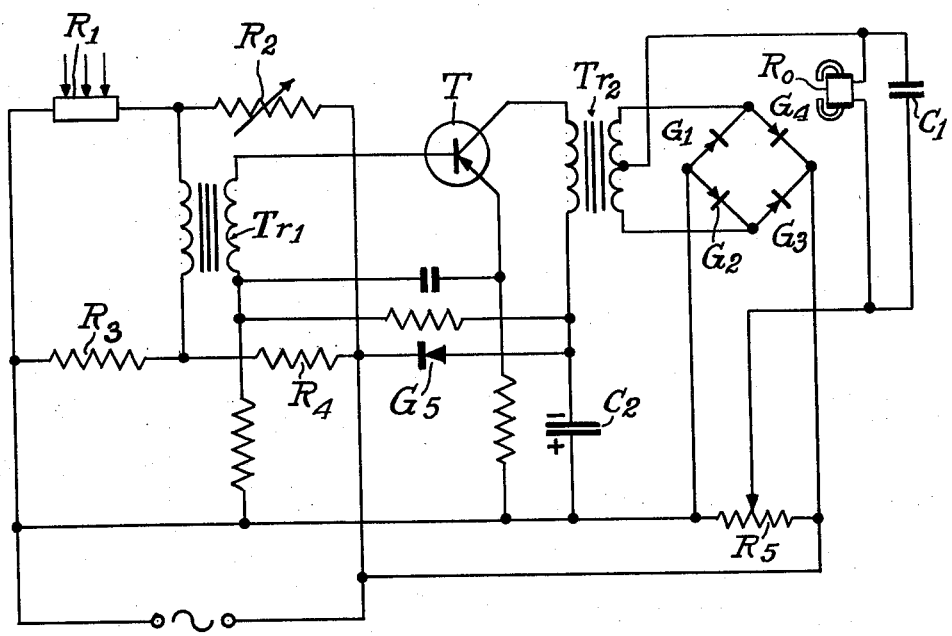
FIG. 5 illustrates still another bridge arrangement employing a transistor and operated by alternating current.

FIG. 5 illustrates an embodiment of the invention in which for the purpose of amplification a transformer coupled amplifying stage with the transistor $T$ and for the rectification a ring demodulator consisting of the four rectifiers $G_1$ to $G_4$ is used. $R_0$ is the control relay and the input and output transformers of the transistor amplifier are designated with $Tr_1$ and $Tr_2$, respectively. This transistor amplifier is supplied with direct current by means of the rectifier $G_5$ and the condenser $C_2$. The annular demodulator is additionally supplied with a constant auxiliary alternating voltage by the potentiometer $R_5$ for straightening out the rectifier characteristic. If an oscillating circuit fed by a battery and having a transistor is used as an alternating current source, then the entire arrangement is suitable for portable devices having a high sensitivity because the sensitivity of the bridge circuit is substantially increased by the amplifier stage. When employing a power transistor, it is possible under certain conditions to supply the output voltage directly to the adjusting motor $M$ of the automatic diaphragm mechanism $D$ rather than to a control relay $R_0$.

In the following will be explained the steps for correcting the steepness deviations of the characteristics of the employed photo resistances from the average values.

Figure 6:
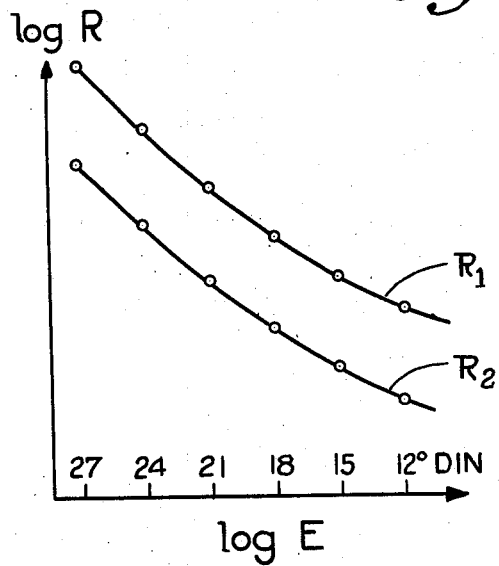
FIG. 6 is a graph showing the resistance-illumination intensity characteristic of an average photo-electric resistance.

FIG. 6 illustrates the course of the characteristic of the resistance ($R$)-illumination intensity ($E$) of an average photo-electric resistance $R_1$ in double logarithmic representation, and shows the adjusting values of the DIN-number adjuster which are proportionally arranged to this characteristic. Also inserted are the working points for the DIN film sensitivities of 12°, 15° and up to 27° DIN. The adjustable diaphragm operates in such a manner that the photo-electric resistance after introduction of the DIN film speed corresponding to the resistance $R_2$ is adjusted to that resistance value $R_1$ which belongs to the introduced value of the corresponding illumination intensity. These adjusting values which belong together have the same abscissas in FIG. 6.

Figure 10:
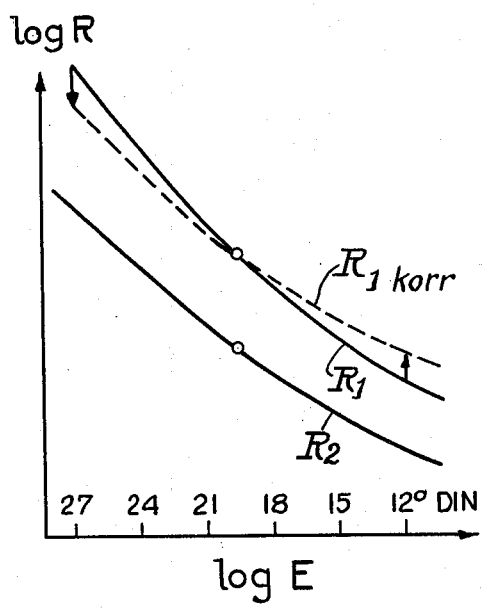
FIG. 10 illustrates a graph showing the effect of the adjusting means employed according to FIG. 8.

It was previously mentioned that radiations of the photo resistances may be compensated for by a suitable selection of the bridge resistances $R_3$ and $R_4$. This compensation is suitably made for an average DIN sensitivity, for instance for $.5(12+27)=19.5°$ DIN. As indicated in FIG. 10, there may, however, also appear particularly at the end points of the characteristic, for instance at 12° and 27° DIN, a few remaining errors due to the deviation from the steepness $$B=\frac{-\Delta \log R}{\Delta \log E}$$

of the photo-electric resistance characteristic from its average value. For eliminating these errors one may proceed as follows:

First of all, when employing a continuously adjustable DIN number adjuster the sensitivity scale may be made dependent upon the steepness of the characteristic of the photo-electric resistance. The rule is that the distance between the graduation lines should be approximately proportionate to the steepness of the characteristic curve of the photo-electric resistance.

Figure 7:
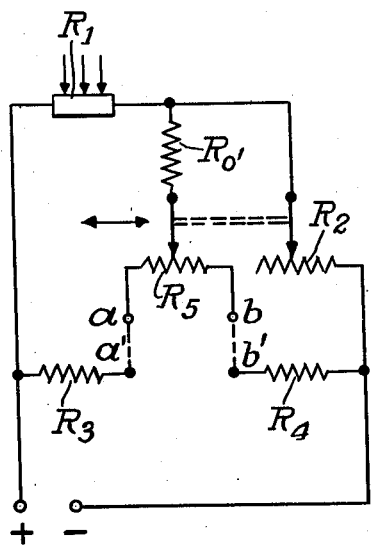
FIG. 7 illustrates another bridge circuit employing a potentiometer for correction of the steepness of the characteristic of the photo-electric resistance.

Secondly, the changes in the steepness of the characteristic of the photo-electric resistance may be eliminated by adjusting the bridge circuit resistance not to a value which is a completely constant resistance ratio. This resistance ratio, as shown in FIG. 7, may suitably be made variable by inserting a potentiometer $R_5$ which is coupled with the DIN number adjuster $R_2$ and making this potentiometer $R_5$ adjustable within relatively narrow limits. Depending upon whether the connecting points $aa'$, $bb'$ or $a'b$, $ab'$ are connected with each other, it is possible to correct steepness variations which are too small or too large.

Figure 8:
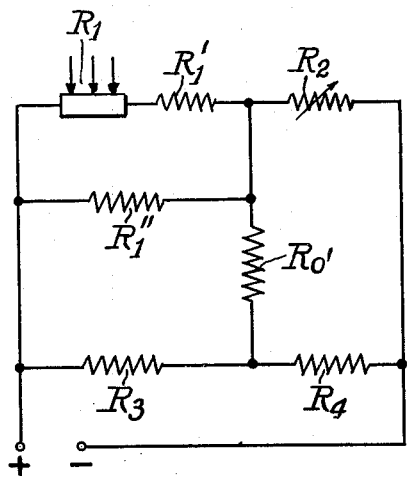
FIG. 8 illustrates still another bridge circuit with means for changing the adjusting values.
Figure 9:
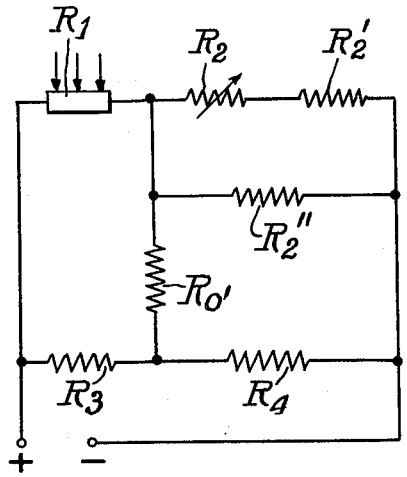
FIG. 9 illustrates another bridge circuit with means for changing the adjusting value.

Finally, it is also possible to change the adjusting values of the bridge circuit by a simultaneous application of a series and a parallel resistance connected with the photo-electric resistance as shown in FIG. 8, or with the DIN number adjuster as shown in FIG. 9.

FIG. 10 is a graph which illustrates the effect of the additional resistances $R_1'$ and $R_2'$ in accordance with the embodiment of the invention shown in FIG. 8. The series resistance $R_1'$ effects a resistance increase of $R_1$ when the DIN film sensitivity is low. The parallel resistance $R_1''$ has the effect of decreasing the value of the resistance $R_1$ when the DIN film sensitivity is high. The result of the cooperation of the three resistances $R_1$, $R_1''$ and $R_2'$ is that the characteristic of the photo-electric resistance $R_1$ is changed to $R_1{}_{korr}$.

Figure 11:
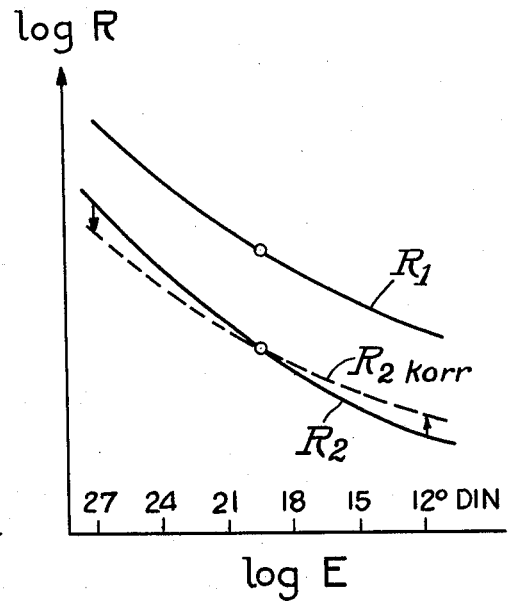
FIG. 11 illustrates a graph showing the effect of the adjusting means employed according to FIG. 9.

FIG. 11 illustrates the graph of the circuit arrangement shown in FIG. 9 in which photo-electric resistances are used whose steepness characteristics are too small. By employing the additional resistances $R_2'$ and $R_2''$, the characteristic $R_2$ of the DIN number adjuster is transformed into the characteristic $R_2{}_{korr}$ which matches the characteristic of the photo-electric resistance $R_1$.

What we claim is:

1. A bridge circuit operated by direct current, including a photo-conductive cell having arranged in front thereof an automatically controllable light decreasing device for controlling light measuring devices, particularly in a camera with an automatic diaphragm mechanism, characterized in this, that for introducing the factors of film speed, filter transmissivity, transmissivity of the adjustable diaphragm, and image frequency or exposure time, which factors influence the diaphragm aperture required for a correct exposure, a bridge circuit $R_2$ is provided which is arranged in series with the photo-conductive cell $R_1$ and is variable according to the values of the photo-conductive cell $R_1$, said values being produced at the illumination intensity required for a correct exposure under consideration of said exposure factors, so that the resistance ratio $u=R_1:R_2=R_3:R_4$ present when the bridge is balanced is always adjusted to a value $1<u<10$, for a photo-conductive cell of average sensitivity with an accuracy of $\pm 30\%$ with respect to the value $u=\sqrt{1+(R_1{}_{min}+R_3)/R_0}$ when $R_1{}_{min}$ signifies the smallest resistance value adopted by an average photo-conductive cell while $R_3$ is the bridge resistance being connected with the photo-conductive cell, and $R_0$ is the resistance in the diagonal branch of the bridge with the relay.

2. A bridge circuit according to claim 1, characterized in that for the purpose of load adaptation of the photo-conductive cell to the relay resistance there is used for a bridge resistance $R_3$ a resistance of the type which fulfills the relation $(R_1{}_{max}+R_3)/R_0=1+u$.

3. A bridge circuit according to claim 1, characterized in that for the purpose of obtaining a load adaptation of at least 90% the bridge resistances are so selected that they lie within the tolerance range of $$1,2<u=R_1/R_2=R_3/R_4<3,2$$

and $$1,5<v=(R_1+R_3)/R_0<6$$

References Cited in the file of this patent

UNITED STATES PATENTS

| | | |
|---|---|---|
| 2,592,035 | Jacoby | Apr. 8, 1952 |
| 2,683,402 | Bruck | July 13, 1954 |
| 2,913,969 | Faulhaber | Nov. 24, 1959 |
| 3,000,280 | Faulhaber | Sept. 19, 1961 |

FOREIGN PATENTS

| | | |
|---|---|---|
| 1,223,439 | France | Feb. 1, 1960 |